Patented Mar. 30, 1943

2,314,976

UNITED STATES PATENT OFFICE 2,314,976

METHOD OF IMPROVING THE ADHESION OF RUBBER TO COTTON

Ivan Gazdik and Edward T. Lessig, Akron, Ohio, assignors to The B. F. Goodrich Company, New York, N. Y., a corporation of New York No Drawing. Application February 11, 1939, Serial No. 255,891

5 Claims. (Cl. 154—2)

This invention relates to the adhesion of rubber to cotton in the form of cords, fabrics, and the like.

The length of service of many articles of commerce embodying cotton and rubber such as tires and belts, for instance, is largely dependent upon the degree of adhesion between the rubber and cotton. The industrial importance of such articles has led to a continual search for methods of increasing said adhesion. It is an object of this invention, accordingly, to provide a method whereby remarkable improvement in the adhesion between rubber and cotton may be obtained.

It is known that the adhesion between rayon and rubber may be improved by a treatment at room temperature with a heat-hardening polyhydricphenol-aldehyde-latex adhesive, of which resorcinol-formaldehyde-latex dispersions are the most widely used. When this treatment is applied to cotton cords, however, no consistent improvement in the adhesion between the cords and the rubber is obtained.

We have discovered that the adhesion of rubber to cotton may be increased by treatment with a heat-hardening polyhydricphenol-aldehyde-latex adhesive if the cotton is subjected to the action of a mild alkaline solution. The solution is preferably of a non-caustic alkali such as ammonium hydroxide, sodium carbonate, ammonium carbonate, etc., although weak solutions of caustic alkalies may be used. In the latter case, the cotton should be treated only with solutions of less than mercerizing strength. Thus treatment in .01% NaOH for 5 min. before treatment with the adhesive produced much better results than treatment in 3.5% NaOH for ½ hr. The cotton is preferably treated in the mild alkaline solution at elevated temperatures, although treatments of cord with caustic alkali solutions at room temperatures have produced good results.

It is essential in the use of caustic alkali and desirable in any case to wash the cord after the alkaline treatment until the alkali is removed. The cord may be washed with water, or, if desired, with a weak acidic solution. The cord is then dried, preferably under tension. Good increases are obtainable by drying the cord in a relaxed state and by treating the wet cord directly with the adhesive, but for the greatest increases in adhesion, the cord is stretched to approximately its original length before drying.

The cord is then given the treatment with a heat-hardening polyhydricphenol-aldehyde-latex adhesive which is old in the art as applied to rayon cords. Examples of suitable adhesives are disclosed in U. S. Patent No. 2,128,229 issued to Charch and Maney. The cord may be treated with the adhesive at room temperature although greater increases in adhesion of the cord to rubber are obtained by treatment at 70° C.–100° C.

To illustrate the invention, cotton tire cord was subjected in a relaxed state to various mild alkaline solutions, washed, dried under tension, dipped at room temperature in a resorcinol-formaldehyde-latex adhesive, and thoroughly dried under tension at 185° F. The cords were then tested for adhesion by vulcanizing rubber containing the cord, cutting from the rubber cylindrical samples in which the cord was diametrically disposed, and compressing the cylinders in a Tinius-Olsen testing machine until separation occurred between the cord and the rubber. The per cent increases in adhesion produced by various alkaline treatments in the above process are as follows:

| Treatment: | Increase in adhesion |
|---|---|
| Boiled cord 1 min. in 1.4% ammonium hydroxide | 124 |
| Boiled cord 10 min. in 10% ammonium carbonate | 134 |
| Boiled cord 1 min. in 0.1% sodium carbonate | 131 |
| Soaked cord at room temperature for 5 min. in 3.5% NaOH | 130 |
| Boiled cord 5 min. in .29% NaOH | 222 |
| Boiled cord 5 min. in .01% NaOH | 170 |
| Boiled cord 30 min. in 3.5% NaOH | 55 |

The last treatment shows the smaller increase in adhesion obtained by treating the cord with caustic alkali until the cotton is at least partly mercerized.

Although we have herein disclosed specific embodiments of our inventions, we do not intend to limit ourselves solely thereto, for it will be obvious to those skilled in the art that many modifications are within the spirit and scope of the invention as defined in the appended claims.

We claim:

1. In a process of treating cotton with a heat-hardening polyhydricphenol-aldehyde adhesive, the step which comprises subjecting the cotton to the action of a mild alkaline solution prior to treatment with the adhesive.

2. In a process of treating cotton cord with a heat-hardening resorcinol - formaldehyde - latex adhesive, the steps which comprise subjecting the cotton cord in a relaxed state to the action of a mild alkaline solution, washing the cord, and drying the cord under tension prior to treatment with the adhesive.

3. In a process of treating cotton cord with a heat-hardening resorcinol-formaldehyde-latex adhesive, the step which comprises subjecting the cotton to the action of a mild alkaline solution at an elevated temperature prior to treatment with the adhesive.

4. A process of improving the adhesion of cotton to rubber which comprises subjecting the cotton to the action of a mild alkaline solution, drying the cotton, coating the cotton with a heat-hardening polyhydricphenol-aldehyde-latex adhesive, drying the coated cotton, associating the treated cotton with a vulcanizable rubber composition, and vulcanizing the composite product.

5. A product containing vulcanized rubber strongly adhered to cotton, which product has been prepared by treating the cotton with a mild alkaline solution, applying a polyhydricphenol-aldehyde-latex adhesive, drying the coated cotton, associating the coated cotton with vulcanizable rubber, and vulcanizing.

IVAN GAZDIK.
EDWARD T. LESSIG.